United States Patent
Nagahama

(10) Patent No.: US 9,169,880 B2
(45) Date of Patent: Oct. 27, 2015

(54) DRIVING FORCE TRANSMISSION APPARATUS AND METHOD OF MANUFACTURING THE SAME

(71) Applicant: JTEKT Corporation, Osaka-shi (JP)

(72) Inventor: Takaya Nagahama, Obu (JP)

(73) Assignee: JTEKT CORPORATION, Osaka-shi (JP)

( * ) Notice: Subject to any disclaimer, the term of this patent is extended or adjusted under 35 U.S.C. 154(b) by 14 days.

(21) Appl. No.: 13/947,575

(22) Filed: Jul. 22, 2013

(65) Prior Publication Data

US 2014/0034440 A1 Feb. 6, 2014

(30) Foreign Application Priority Data

Jul. 31, 2012 (JP) ................. 2012-169170

(51) Int. Cl.
| | |
|---|---|
| F16D 37/02 | (2006.01) |
| F16D 13/52 | (2006.01) |
| F16D 27/115 | (2006.01) |
| F16D 27/04 | (2006.01) |
| F16D 27/00 | (2006.01) |

(52) U.S. Cl.
CPC ............. F16D 13/52 (2013.01); F16D 27/04 (2013.01); F16D 27/115 (2013.01); F16D 2027/008 (2013.01)

(58) Field of Classification Search
CPC ....... F16D 13/52; F16D 27/04; F16D 27/115; F16D 2027/008
USPC ............. 192/84.91, 84.96, 52.3; 310/156.08; 291/598, 607; 475/149, 150, 154, 249, 475/220, 223, 224; 74/665 F
See application file for complete search history.

(56) References Cited

U.S. PATENT DOCUMENTS

| | | | |
|---|---|---|---|
| 4,685,202 A | 8/1987 | Booth et al. | |
| 6,109,408 A | 8/2000 | Ikeda et al. | |
| 2004/0231948 A1* | 11/2004 | Suzuki et al. | 192/84.7 |
| 2006/0144666 A1* | 7/2006 | Aikawa et al. | 192/52.3 |
| 2006/0289265 A1* | 12/2006 | Hirota | 192/84.91 |
| 2007/0045075 A1* | 3/2007 | Kani et al. | 192/35 |
| 2010/0258400 A1 | 10/2010 | Shirai et al. | |
| 2012/0048062 A1* | 3/2012 | Kokubo | 74/665 F |
| 2013/0134816 A1* | 5/2013 | Nagahama et al. | 310/156.08 |
| 2013/0134817 A1* | 5/2013 | Nagahama et al. | 310/156.08 |

FOREIGN PATENT DOCUMENTS

| | | |
|---|---|---|
| EP | 2 216 561 A1 | 8/2010 |
| GB | 2 185 198 A | 7/1987 |
| JP | 11-153157 | 6/1999 |
| JP | 2004-116764 | 4/2004 |

* cited by examiner

OTHER PUBLICATIONS

Extended European Search Report issued Nov. 13, 2013 in Patent Application No. 13177744.3.

Primary Examiner — David J Hlavka
(74) Attorney, Agent, or Firm — Oblon, McClelland, Maier & Neustadt, L.L.P.

(57) ABSTRACT

A magnetic path forming member is formed by heating a radially intermediate portion of a workpiece made of a magnetic material to melt the radially intermediate portion from one axial face of the workpiece to the other axial face of the workpiece to form a keyhole, and disposing an alloy element in a molten pool around the keyhole to demagnetize a melted portion.

8 Claims, 5 Drawing Sheets

DRIVING FORCE TRANSMISSION APPARATUS AND METHOD OF MANUFACTURING THE SAME

INCORPORATION BY REFERENCE

The disclosure of Japanese Patent Application No. 2012-169170 filed on Jul. 31, 2012 including the specification, drawings and abstract is incorporated herein by reference in its entirety.

BACKGROUND OF THE INVENTION

1. Field of the Invention

The invention relates to a driving force transmission apparatus and a method of manufacturing the driving force transmission apparatus.

2. Description of Related Art Japanese Patent Application Publication No. 11-153157 (JP 11-153157 A) and Japanese Patent Application Publication No. 2004-116764 (JP 2004-116764 A) each describe a driving force transmission apparatus in which an electromagnetic clutch unit is used to control a driving force that is transmitted between an outer rotary member and an inner rotary member. The electromagnetic clutch unit includes an electromagnet and a magnetic path forming member. The magnetic path forming member forms a magnetic path in cooperation with an armature and clutch discs. The magnetic path forming member includes a portion that exhibits magnetic properties and a portion that exhibits non-magnetic properties.

JP 11-153157 A describes a method in which a non-magnetic material is joined to a magnetic material by welding to form a magnetic path forming member. JP 2004-116764 A describes a method in which a non-magnetic material is cast into a recess formed in a magnetic material, and thereafter, a part of the magnetic material is cut and removed to form a magnetic path forming member.

The magnetic path forming member is required to have a sufficient strength in order to fulfill a driving force transmitting function. In the case where the magnetic path forming member is formed by welding or casting, a joint between the magnetic material and the non-magnetic material needs to have a certain degree of thickness because the strength of the joint is lower than that of the magnetic material. Further, it is desired that a magnetic path forming member be manufactured at a cost lower than that at which a magnetic path forming member is manufactured by welding or casting.

SUMMARY OF THE INVENTION

One object of the invention is to provide a driving force transmission apparatus including a magnetic path forming member that has a high strength and that is manufactured at a low cost, and to provide a method of manufacturing the driving force transmission apparatus.

An aspect of the invention relates to a driving force transmission apparatus, including: an outer rotary member and an inner rotary member that are rotatable relative to each other; multiple clutch discs that are arranged between the outer rotary member and the inner rotary member, and that transmit driving force between the outer rotary member and the inner rotary member with use of frictional force; an electromagnet arranged on one axial side of the clutch discs; and an armature that is arranged on the other axial side of the clutch discs, and that is attracted toward the electromagnet when the electromagnet is energized. The outer rotary member includes a magnetic path forming member that is arranged between the clutch discs and the electromagnet and that forms a magnetic path in cooperation with the electromagnet, the clutch discs and the armature when the electromagnet is energized. The magnetic path forming member is formed by heating a radially intermediate portion of a workpiece made of a magnetic material to melt the radially intermediate portion from one axial face of the workpiece to the other axial face of the workpiece to form a keyhole, and disposing an alloy element in a molten pool around the keyhole to demagnetize a melted portion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
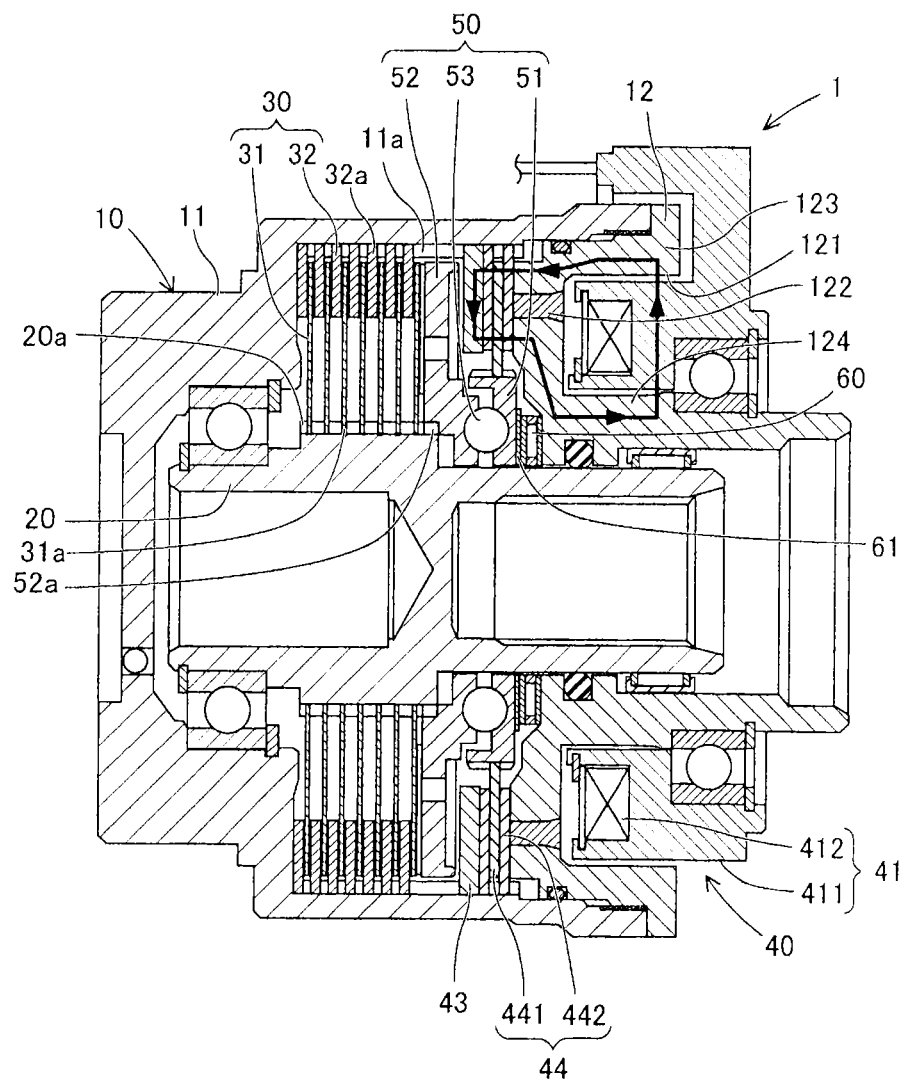
FIG. 1 is a sectional view illustrating a driving force transmission apparatus according to a first embodiment of the invention, taken along the axial direction of the driving force transmission apparatus.

Hereafter, a driving force transmission apparatus 1 according to a first embodiment of the invention will be described with reference to FIG. 1 and FIG. 2. The driving force transmission apparatus 1 is used in, for example, a driving force transmission system for auxiliary drive wheels of a four-wheel-drive vehicle, to which driving force is transmitted depending on a travelling state of the vehicle. More specifically, in the four-wheel-drive vehicle, the driving force transmission apparatus 1 is, for example, arranged between and coupled to a propeller shaft to which driving force is transmitted from an engine and a rear differential for the auxiliary drive wheels, or arranged between and coupled to the rear differential and a drive shaft. Hereinafter, the former case will be described as an example. The driving force transmission apparatus 1 transmits the driving force transmitted from the propeller shaft, to the auxiliary drive wheels with a variable distribution ratio. For example, when a difference in rotational speed is caused between front wheels and rear wheels, the driving force transmission apparatus 1 operates to reduce the difference in rotational speed.

The driving force transmission apparatus 1 is a so-called electronically-controlled coupling. As shown in FIG. 1, the driving force transmission apparatus 1 includes an outer case 10, an inner shaft 20, a main clutch 30, an electromagnetic clutch unit 40, and a cam mechanism 50. The electromagnetic clutch unit 40 constitutes a pilot clutch mechanism.

The outer case 10 (which may function as an outer rotary member according the invention) is arranged radially inward of a cylindrical hole cover (not shown), and is supported so as to be rotatable relative to the hole cover. The outer case 10 is formed in a cylindrical shape as a whole, and is formed of a front housing 11 and a rear housing 12 located closer to the rear of the vehicle than the front housing 11.

The front housing 11 is made of for example, an aluminum alloy that is a non-magnetic material containing aluminum as a main component, and is formed in a bottomed tubular shape. A cylindrical portion of the front housing 11 is rotatably supported at its outer peripheral face by an inner peripheral face of the hole cover via a bearing. Further, a bottom portion of the front housing 11 is coupled to a rear end of the propeller shaft (not shown) in the vehicle longitudinal direction. Namely, the front housing 11 is arranged such that the opening side of the front housing 11 in the bottomed tubular shape faces the rear of the vehicle. Internal splines 11a are formed in an axial center portion of an inner peripheral face of the front housing 11, and an internal thread is formed in a portion of the inner peripheral face of the front housing 11, which is located near the opening.

The rear housing 12 (which may function as a magnetic path forming member according to the invention) is formed in an annular shape, and is arranged radially inward of the opening-side portion of the front housing 11 so as to be fixedly fitted to the front housing 11. An annular recessed portion 121 (shown in FIG. 1 and FIG. 2) opened toward the rear side of the vehicle (one side of a rotational axis) is formed in the rear housing 12. An annular radially intermediate portion 122 in a bottom face of the recessed portion 121 of the rear housing 12 is made of a non-magnetic material. Other portions 123, 124 (a radially outer portion 123 and a radially inner portion 124) of the rear housing 12 are made of a magnetic material.

The radially outer portion 123 and the radially inner portion 124 of the rear housing 12 serve as members that form a magnetic path (indicated by a bold arrow in FIG. 1) in the electromagnetic clutch unit 40. An external thread 125 is formed in an outer peripheral face of the rear housing 12, and the external thread 125 is tightened into the internal thread of the front housing 11. Note that, the opening end face of the front housing 11 is brought into contact with an end face of a step portion of the rear housing 12 by tightening the internal thread of the front housing 11 to the external thread 125 of the rear housing 12, whereby the front housing 11 and the rear housing 12 are fixed to each other. A method of manufacturing the rear housing 12 will be described later.

External splines 20a are formed in an axial center portion of an outer peripheral face of the inner shaft 20. The inner shaft 20 is extended through a though-hole formed in the rear housing 12 along the central axis of the rear housing 12 in a liquid-tight manner, and is arranged in the outer case 10 coaxially with the outer case 10 so as to be rotatable relative to the outer case 10. Further, the inner shaft 20 is rotatably supported by the front housing 11 and the rear housing 12 via bearings in a state where the axial position of the inner shaft 20 with respect to both the front housing 11 and the rear housing 12 is restricted. Further, the rear end portion in the vehicle longitudinal direction (right side portion in FIG. 1), of the inner shaft 20 is coupled to a differential (not shown). Lubrication oil is supplied, at a predetermined filling ratio, in a space that is defined by the outer case 10 and the inner shaft 20 in a liquid-tight manner.

The main clutch 30 transmits torque between the outer case 10 and the inner shaft 20. The main clutch 30 is a wet multi-disc friction clutch made of an iron-based material. The main clutch 30 is located between an inner peripheral face of the cylindrical portion of the front housing 11 and the outer peripheral face of the inner shaft 20 in the radial direction. Further, the main clutch 30 is located between the bottom portion of the front housing 11 and the front end face in the vehicle longitudinal direction, of the rear housing 12 in the axial direction. The main clutch 30 includes inner main clutch discs 31 and outer main clutch discs 32, which are alternately arranged in the axial direction. Internal splines 31a are formed in the inner peripheral side of the inner main clutch discs 31, and are fitted to the external splines 20a of the inner shaft 20. External splines 32a are formed in the outer peripheral side of the outer main clutch discs 32, and are fitted to the internal splines 11a of the front housing 11.

The electromagnetic clutch unit 40 allows transmission of driving force, with the use of frictional force of a pilot clutch 44, between the outer case 10 and a support cam member 51 that constitutes the cam mechanism 50. The electromagnetic clutch unit 40 includes an electromagnet 41, an armature 43 and the pilot clutch 44.

The electromagnet 41 includes a yoke 411 and an electromagnetic coil 412. The yoke 411 is formed into an annular shape, and is accommodated in the recessed portion 121 of the rear housing 12 with a clearance so as to be rotatable relative to the rear housing 12. The yoke 411 is secured to the hole cover. The yoke 411 is rotatably supported at its inner peripheral portion to the rear housing 12 via a bearing. The electromagnetic coil 412 is formed into an annular shape by winding a wire, and is secured to the yoke 411.

The armature 43 is made of an iron-based material. The armature 43 is formed in an annular shape, and external splines are formed in the outer periphery of the armature 43. The armature 43 is located between the main clutch 30 and the rear housing 12 in the axial direction. The external splines formed in the outer periphery of the armature 43 are fitted to the internal splines 11a of the front housing 11. When a current is supplied to the electromagnetic coil 412, the armature 43 is attracted toward the yoke 411.

The pilot clutch 44 transmits torque between the outer case 10 and the support cam member 51. The pilot clutch 44 is made of an iron-based material. The pilot clutch 44 is located between the inner peripheral face of the cylindrical portion of the front housing 11 and an outer peripheral face of the support cam member 51 in the radial direction. Further, the pilot clutch 44 is located between the armature 43 and the rear housing 12 in the axial direction. The pilot clutch 44 includes an inner pilot clutch disc 441 and outer pilot clutch discs 442 that are alternately arranged in the axial direction. The inner pilot clutch disc 441 has internal splines formed in its inner peripheral side, and is fitted to external splines of the support cam member 51. Each of the outer pilot clutch discs 442 has external splines formed on its outer peripheral side, and is fitted to the internal splines 11a of the front housing 11.

Figure 2:
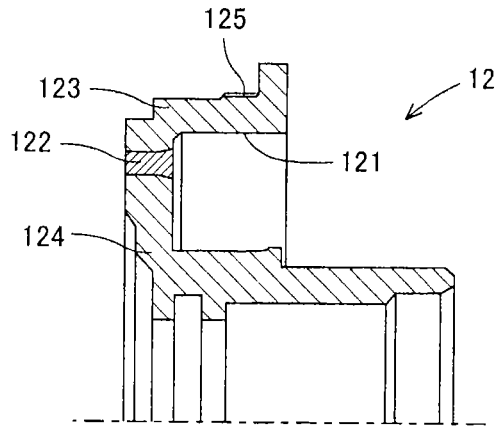
FIG. 2 is a sectional view illustrating a rear housing shown in FIG. 1, taken along the axial direction of the rear housing (the axial direction is illustrated as the horizontal direction)

When the electromagnetic coil 412 is energized, as indicated by the arrow in FIG. 1, the magnetic path (indicated by the bold arrow in FIG. 1) that passes through the yoke 411, the radially outer portion 123 of the rear housing 12, the pilot clutch 44, the armature 43, the pilot clutch 44, the radially inner portion 124 of the rear housing 12 and the yoke 411, is formed. Thus, the armature 43 is attracted toward the yoke 411, and accordingly, the inner pilot clutch disc 441 and the outer pilot clutch discs 442 are pressed against each other. As a result, driving force is transmitted from the outer case 10 to the support cam member 51. On the other hand, when the electromagnetic coil 412 is de-energized, the force for attracting the armature 43 toward the yoke 411 is lost, resulting in reduction of the force of friction between the inner pilot clutch disc 441 and the outer pilot clutch discs 442. As a result, transmission of the driving force is cut off.

The cam mechanism 50 is arranged between the main clutch 30 and the pilot clutch 44. The cam mechanism 50 converts torque, which is transmitted via the pilot clutch 44 and % which is based on the difference in rotational speed between the outer case 10 and the inner shaft 20, into axial pressing force for pressing the main clutch 30. The cam mechanism 50 includes the support cam member 51, a movable cam member 52 and cam followers 53.

The support cam member 51 (which may function as an inner roar member according to the invention) is formed in an annular shape, and has external splines on its outer peripheral side. A cam groove is formed in the front end face in the vehicle longitudinal direction, of the support cam member 51. The support cam member 51 is arranged, with a clearance, radially outward of the outer peripheral face of the inner shaft 20, and is supported by the front end face in the vehicle longitudinal direction, of the rear housing 12 via a thrust bearing 60. Thus, the support cam member 51 makes contact, at its rear end face in the vehicle longitudinal direction, with a raceway disc of the thrust bearing 60 via a shim 61. Namely, the support cam member 51 is rotatable relative to both the inner shaft 20 and the rear housing 12 but is restrained from moving in the axial direction. Further, the external splines of the support cam member 51 are fitted to the internal splines of the inner pilot clutch disc 441.

Most part of the movable cam member 52 is made of an iron-based material, and the movable cam member 52 is formed in an annular shape and has internal splines on its inner peripheral side. The movable cam member 52 is located forward of the support cam member 51 in the vehicle longitudinal direction. A cam groove is formed in the rear end face in the vehicle longitudinal direction, of the movable cam member 52 so as to be axially opposed to the cam groove of the support cam member 51. The internal splines of the movable cam member 52 are fitted to the external splines 20*a* of the inner shall 20. Thus, the movable cam member 52 is rotated together with the inner shaft 20. Further, the front end face in the vehicle longitudinal direction, of the movable cam member 52 is allowed to make contact with one of the inner main clutch discs 31 in the main clutch 30, which is the rearmost inner main clutch disc 31 in the vehicle longitudinal direction. When the movable cam member 52 moves toward the front of the vehicle, the movable cam member 52 presses the rearmost inner main clutch disc 31 toward the front of the vehicle.

The cam followers 53 are formed in a ball shape, and are arranged in the cam groove of the support cam member 51 and the cam groove of the movable cam member 52, which are opposed to each other. That is, under the action of the cam followers 53 and the cam grooves, the movable cam member 52 is moved in such a direction that the movable cam member 52 moves away from the support cam member 51 in the axial direction (moves toward the front of the vehicle) when a difference in rotational speed is caused between the support cam member 51 and the movable cam member 52. The larger the torsion angle between the support cam member 51 and the movable cam member 52 is, the larger the amount by which the movable cam member 52 is apart from the support cam member 51 in the axial direction is.

Next, the basic operation of the driving force transmission apparatus 1 having the above-described configuration will be described. The case where a difference in rotational speed between the outer case 10 and the inner shaft 20 is caused will be described. When the electromagnetic coil 412 of the electromagnetic clutch unit 40 is energized, a looped magnetic path starting from the electromagnetic coil 412 and passing through the yoke 411, the rear housing 12 and the armature 43 is formed.

Because the magnetic path is formed as described above, the armature 43 is attracted toward the yoke 411, that is, attracted toward the rear of the vehicle in the axial direction. As a result, the armature 43 presses the pilot clutch 44, resulting in the state where the inner pilot clutch disc 441 and the outer pilot clutch discs 442 are pressed against each other. Thus, due to force of friction between the clutch discs 441, 442, driving force is transmitted from the outer case 10 to the support cam member 51 via the pilot clutch 44, and accordingly, the support cam member 51 is rotated.

The movable cam member 52 is spline-engaged with the inner shaft 20, and accordingly, is rotated together with the inner shaft 20. Thus, a difference in rotational speed is caused between the support cam member 51 and the movable cam member 52. Accordingly, under cam action of the cam followers 53 and the cam grooves, the movable cam member 52 is moved in the axial direction (toward the front of the vehicle), relative to the support cam member 51. As a result, the movable cam member 52 presses the main clutch 30 toward the front of the vehicle.

As a result, the inner main clutch discs 31 and the outer main clutch discs 32 are pressed against each other. Thus, due to force of friction between the clutch discs 31, 32, driving force is transmitted from the outer case 10 to the inner shaft 20 via the main clutch 30. Accordingly, the difference in rotational speed between the outer case 10 and the inner shaft 20 is reduced. Note that the frictional force of the main clutch 30 is controlled by controlling the amount of electric current that is supplied to the electromagnetic coil 412. That is, the driving force that is transmitted between the outer case 10 and the inner shaft 20 is controlled by controlling the amount of electric current that is supplied to the electromagnetic coil 412.

Next, a method of manufacturing the rear housing 12 will be described with reference to FIG. 3, FIG. 4A to FIG. 4C, FIG. 5, and FIG. 6. The rear housing 12 is formed by reforming a portion of a workpiece 100, which corresponds to the radially intermediate portion 122 and which is made of a magnetic material, into a non-magnetic portion. Specifically, the portion, which corresponds to the radially intermediate portion 122, is melted from one axial face to the other axial face of the workpiece 100 by heating the portion, which corresponds to the radially intermediate portion 122, to form a keyhole 102, and then, by supplying an alloy element 110 in a molten pool 103 around the keyhole 102, the radially intermediate portion 122 that is demagnetized is formed. The method will be described in detail The workpiece 100 having a shape as shown in FIG. 4A is prepared (step S1 in FIG. 3). The workpiece 100 is made of a material containing, as a main component, iron that is a magnetic material, (hereinafter, referred to as "iron-based material"), such as low carbon steel. As shown in FIG. 4A, the workpiece 100 has a recessed portion 121, like the rear housing 12 that has a final configuration. Further, the bottom face of the recessed portion 121 of the workpiece 100 has an annular groove 101 at a portion corresponding to the radially intermediate portion 122. The annular groove 101 has a radial width that is substantially equal to or slightly smaller than the radial width of the radially intermediate portion 122 of the rear housing 12 that has the final configuration.

Figure 3:
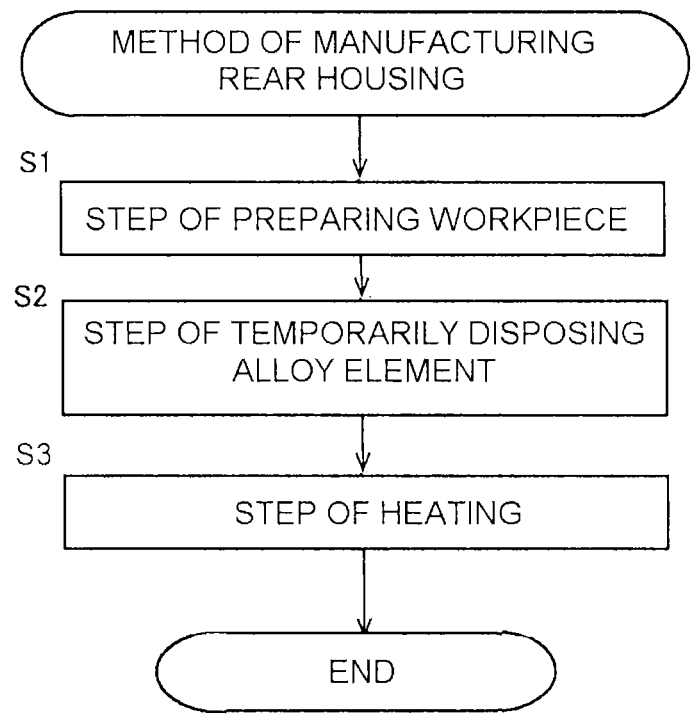
FIG. 3 is a flowchart for explaining a method of manufacturing the rear housing shown in FIG. 2.
Figure 4A:
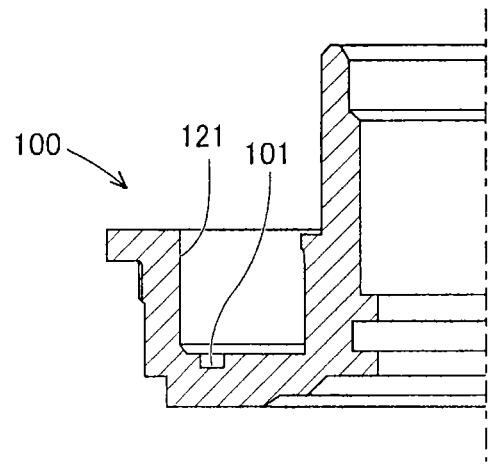
FIG. 4A is a sectional view illustrating a workpiece for the rear housing in step S1 shown in FIG. 3 (the axial direction is illustrated as the vertical direction)
Figure 4B:
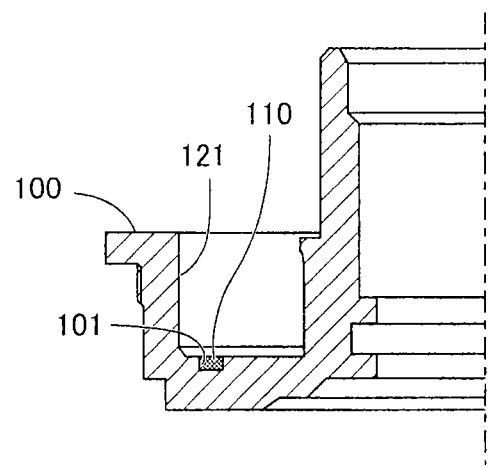
FIG. 4B is a sectional view illustrating the workpiece for the rear housing and an alloy element in step S2 shown in FIG. 3 (the axial direction is illustrated as the vertical direction)

Next, as shown in FIG. 4B, the alloy element 110 in a powdered state is temporarily disposed in the annular groove 101 of the workpiece 100, and the workpiece 100 and the alloy element 110 are integrated with each other by pressing (step S2 in FIG. 3). At this time, the alloy element 110 and the bottom face of the recessed portion 121 of the workpiece 100 are made to be flush with each other. A material that causes the workpiece 100 to be demagnetized by being alloyed with the workpiece 100, such as manganese, chromium or nickel, is used as the alloy element 110. Note that, not only the alloy element 110 in a powdered state but also the alloy element 110 in a solid state may be used.

Figure 4C:
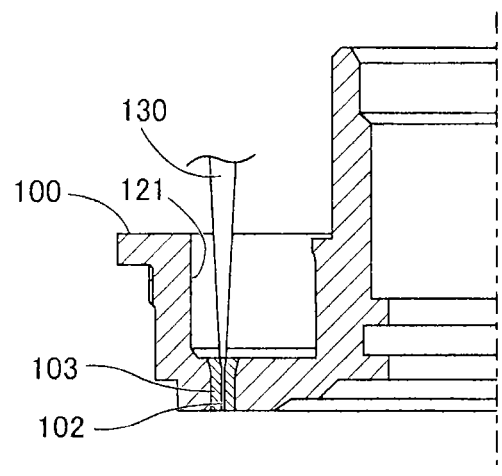
FIG. 4C is a sectional view illustrating the workpiece for the rear housing in a state where the workpiece is heated in step S3 shown in FIG. 3 (the axial direction is illustrated as the vertical direction)
Figure 5:
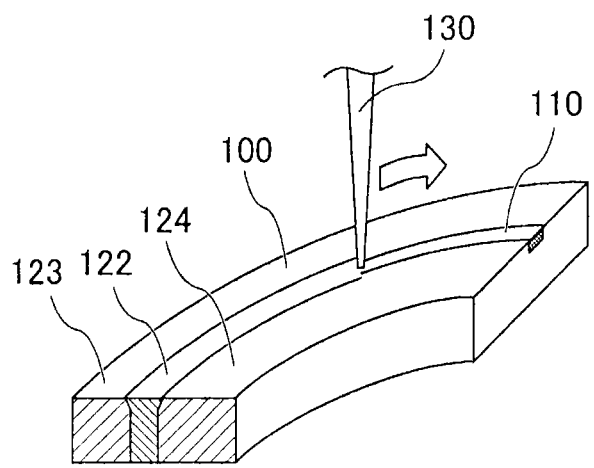
FIG. 5 is a perspective view illustrating part of the rear housing in step S3 shown in FIG. 3 (the axial direction is illustrated as the vertical direction)
Figure 6:
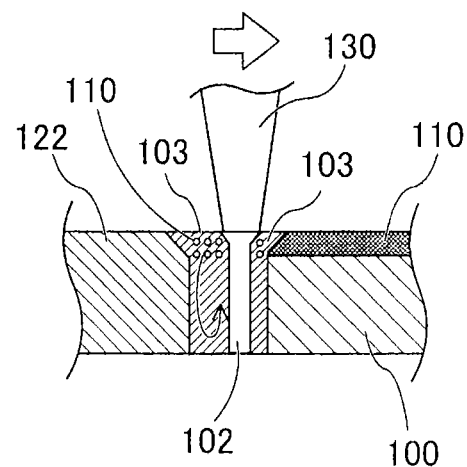
FIG. 6 is an enlarged view illustrating a section of the rear housing in step S3 shown in FIG. 3, taken along the circumferential direction of the rear housing (the axial direction is illustrated as the vertical direction)

Then, the portion of the workpiece 100, at which the alloy element 110 is temporarily disposed (corresponding to the radially intermediate portion 122), is heated (step S3 in FIG. 3). For example, as shown in FIG. 4C, FIG. 5 and FIG. 6, this portion of the workpiece 100 is irradiated with a laser beam 130 from the recessed portion 121 side while the position that is irradiated with the laser beam 130 is shifted in the circumferential direction.

Through irradiation of the laser beam 130, the keyhole 102 is formed in the workpiece 100 at the position that has been irradiated with the laser beam 130. The keyhole 102 is a circular hole that is formed, through irradiation of the laser beam 130, so as to extend from the irradiated face to the back face of the workpiece 100 irradiated with the laser beam 130. Further, as shown in FIG. 6, metal is evaporated during formation of the keyhole 102, and the molten pool 103 is formed around the keyhole 102. That is, the molten pool 103 is formed so as to extend from the laser irradiated face to the back face of the workpiece 100.

Because the alloy element 110 is temporarily disposed in the annular groove 101 of the workpiece 100, the alloy element 110 is supplied to the molten pool 103. Convection tends to occur in the molten pool 103 (refer to an arc-shaped arrow in FIG. 6). In particular, the convention tends to occur at a position behind, in the direction of progress of irradiation, the position being irradiated with the laser beam 130. The alloy element 110 supplied to the molten pool 103 is diffused from the laser irradiated face toward the back face of the workpiece 100 due to the convection in the molten pool 103, and is finally supplied to the back face side of the workpiece 100.

Thus, the portion corresponding to the molten pool 103 is alloyed due to the presence of the alloy element 110, and is demagnetized from the laser irradiated face to the rear face. The thus formed demagnetized portion constitutes the radially intermediate portion 122.

As described above, by reforming a portion of the workpiece 100 which is a single-piece member, the radially intermediate portion 122, which is a non-magnetic portion, and the radially outer portion 123 and the radially inner portion 124, which are ferromagnetic portions, are formed in the rear housing 12. Thus, the radially intermediate portion 122 is joined to the radially outer portion 123 and the radially inner portion 124 at a stronger joining force, and accordingly, the strength of the rear housing 12 is increased as a whole. If the rear housing 12 is required to have a strength that is substantially equal to that of a rear housing formed by welding or casting, the bottom portion of the recessed portion 121 in the rear housing 12 may have an axial thickness smaller than that of the rear housing formed by welding or casting. As a result, it is possible to reduce the size of the driving force transmission apparatus 1. Further, in comparison with the case where the rear housing 12 is formed by welding or casting, the manufacturing cost is reduced.

Further, before heating by the laser beam 130, the alloy element 110 is integrated with the workpiece 100 by pressing. Namely, the step of disposing the alloy element 110 in the workpiece 100 and the step of heating by the laser beam 130 are carried out separately. In the case where supply of the alloy element 110 and heating of the workpiece 100 are carried out at the same time, unless the amount of supply of the alloy element 110 to the keyhole 102 per unit time and the amount of formation of the molten pool 103 in the workpiece 100 per unit time are synchronized with each other at a high degree of accuracy, variations may occur in the blending ratio of the alloy element 110.

However, in the present embodiment, the step of disposing the alloy element 110 in the workpiece 100 and the step of heating by the laser beam 130 are separately carried out. Therefore, it is not necessary to synchronize the amount of supply of the alloy element 110 per unit time and the amount of formation of the molten pool 103 in the workpiece 100 per unit time in order to uniformize the blending ratio of the alloy element 110. Thus, each of these steps is easily carried out. As a result, the manufacturing cost is reduced. Further, because the alloy element 110 is disposed in the workpiece 100 before heating, the alloy element 110 is smoothly diffused in the irradiation depth direction during formation of the keyhole 102. Thus, the radially intermediate portion 122 of the rear housing 12 is reliably demagnetized.

Further, the demagnetized radially intermediate portion 122 may be formed in a wine glass shape as shown in FIG. 4C and FIG. 5. That is, in the demagnetized radially intermediate portion 122, the radial width of the surface side portion irradiated with the laser beam 130 is larger than that of the opposite surface side portion. It is considered that, this is because the temperature of the surface side portion irradiated with the laser beam 130 tends to be higher than that of the opposite surface side portion.

The magnetic path passes through the rear housing 12 so as to continuously extend from the electromagnet 41 to the pilot clutch 44 located on the opposite side of the rear housing 12 from the electromagnet 41. Therefore, in the surface of the rear housing 12, which is brought into contact with the pilot clutch 44 (the surface on the opposite side of the rear housing 12 from the electromagnet 41), the area of a portion as a magnetic material is preferably larger.

Therefore, the keyhole 102 is formed by irradiating the workpiece 100 with the laser beam 130 from the recessed portion 121 that accommodates the electromagnet 41, so that the radial width of a portion of the non-magnetic portion 122, which is on the side opposite to the recessed portion 121 (on the pilot clutch 44 side), is made smaller than the radial width of a portion of the demagnetized portion 122, which is on the recessed portion 121 side (on the electromagnet 41 side). Accordingly, it is possible to ensure a sufficient force for attracting the pilot clutch 44.

In the above-described embodiment, the alloy element 110 is temporarily disposed in advance in the annular groove 101 of the workpiece 100. Alternatively, the alloy element 110 may be supplied in the form of, for example, an alloy rod during irradiation of the laser beam 130. In this case, the position of the alloy rod is shifted in accordance with the shift of the position irradiated with the laser beam 130.

Next, a rear housing 212 according to a second embodiment of the invention will be described with reference to FIG. 7 and FIG. 8. Only the differences from the first embodiment will be described below. Note that, in the following description, the same configurations as those in the first embodiment will be denoted by the same reference numerals as those in the first embodiment.

Figure 7:
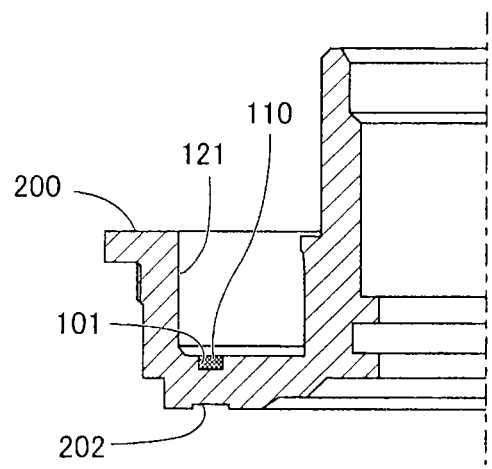
FIG. 7 is a sectional view illustrating a workpiece for a rear housing in a second embodiment of the invention (the axial direction is illustrated as the vertical direction)
Figure 8:
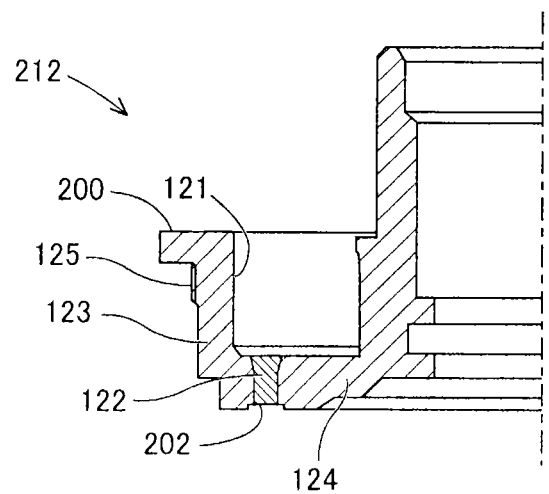
FIG. 8 is a sectional view illustrating the rear housing in the second embodiment of the invention (the axial direction is illustrated as the vertical direction).

As shown in FIG. 7, a recessed portion-side annular groove 101 (similar to the annular groove 101 in the first embodiment), in which the alloy element 110 is temporarily disposed, is formed in a workpiece 200 for the rear housing 212, at a position on the recessed portion 121 side. Further, a recessed portion opposite side annular groove 202 is formed in the workpiece 200, at a portion that corresponds to the recessed portion-side annular groove 101 and that is in the surface on the opposite side of the workpiece 200 from the recessed portion 121. The recessed portion opposite side annular groove 202 has a radial width that is slightly larger than the radial width of a portion that is demagnetized to be formed into the radially intermediate portion 122.

After the alloy element 110 is temporarily disposed in the recessed portion-side annular groove 101 of the workpiece 200, the workpiece 200 is irradiated with the laser beam 130 from the recessed portion 121 side to form the keyhole 102 (refer to FIG. 4C). The thus formed rear housing 212 is as shown in FIG. 8. That is, the demagnetized radially intermediate portion 122 is formed in a portion of the recessed portion opposite side annular groove 202.

In the case where the workpiece 200 for the rear housing 212 is heated to form the keyhole 102, the heated portion may be deformed slightly. For example, the heated portion may be projected or recessed. Therefore, as in the present embodiment, the recess portion opposite side annular groove 202 is formed in advance in a portion of the workpiece 200, which is on the pilot clutch 44 side and which corresponds to the radially intermediate portion 122 (a portion to be demagnetized), and then the keyhole 102 is formed in the bottom of the recessed portion opposite side annular groove 202. In this way, even if the demagnetized portion is deformed to be projected or recessed, it is possible to prevent the demagnetized portion from making contact with the pilot clutch 44.

That is, when the pilot clutch 44 is attracted toward the rear housing 212, the pilot clutch 44 makes contact with both the radially outer portion 123 and the radially inner portion 124 that are made of a magnetic material, without making contact with the radially intermediate portion 122, which is a demagnetized portion of the rear housing 212. Note that, in the present embodiment, the workpiece 200 may be irradiated with the laser beam 130 from the recessed portion opposite side annular groove 202 side.

What is claimed is:

1. A method of manufacturing a magnetic path forming member of a driving force transmission apparatus including,
an outer rotary member and an inner rotary member that are rotatable relative to each other,
multiple clutch discs that are arranged between the outer rotary member and the inner rotary member, and that transmit driving force between the outer rotary member and the inner rotary member with use of frictional force,
an electromagnet arranged on one axial side of the clutch discs,
an armature that is arranged on another axial side of the clutch discs, and that is attracted toward the electromagnet when the electromagnet is energized, and
the magnetic path forming member being included in the outer rotary member, is arranged between the clutch discs and the electromagnet, and forms a magnetic path in cooperation with the electromagnet, the clutch discs and the armature when the electromagnet is energized, the method comprising:
heating a radially intermediate portion of a workpiece and made of a magnetic material, to melt the radially intermediate portion from one axial face of the workpiece to another axial face of the workpiece to form a keyhole; and
disposing an alloy element in a molten pool around the keyhole to demagnetize a melted portion, thereby providing the magnetic path forming member.

2. The method according to claim 1, including a step of pressing the alloy element to integrate the alloy element with the radially intermediate portion of the workpiece, and subsequently heating the radially intermediate portion to form the keyhole.

3. The method according to claim 1, wherein a recessed portion that is opened toward one axial side and that accommodates the electromagnet is formed in the magnetic path forming member,
further comprising a step of forming the magnetic path forming member by irradiating a radially intermediate portion of a bottom face of the recessed portion of the workpiece with a laser beam from the recessed portion side to form the keyhole, so that, in a demagnetized portion, a radial width of a portion on a side opposite to the recessed portion is made smaller than a radial width of a portion on the recessed portion side.

4. The method according to claim 2, wherein a recessed portion that is opened toward one axial side and that accommodates the electromagnet is formed in the magnetic path forming member,
further comprising a step of forming the magnetic path forming member by irradiating a radially intermediate portion of a bottom face of the recessed portion of the workpiece with a laser beam from the recessed portion side to form the keyhole, so that, in a demagnetized portion, a radial width of a portion on a side opposite to the recessed portion is made smaller than a radial width of a portion on the recessed portion side.

5. The method according to claim 1, wherein:
an annular groove is formed in a clutch disc-side portion of the radially intermediate portion of the workpiece; and
the keyhole is formed in a bottom of the annular groove to demagnetize the melted portion.

6. The method according to claim 2, wherein:
an annular groove is formed in a clutch disc-side portion of the radially intermediate portion of the workpiece; and
the keyhole is formed in a bottom of the annular groove to demagnetize the melted portion.

7. The method according to claim 3, wherein:
an annular groove is formed in a clutch disc-side portion of the radially intermediate portion of the workpiece; and
the keyhole is formed in a bottom of the annular groove to demagnetize the melted portion.

8. The method according to claim 4, wherein:
an annular groove is formed in a clutch disc-side portion of the radially intermediate portion of the workpiece; and
the keyhole is formed in a bottom of the annular groove to demagnetize the melted portion.

* * * * *